3,560,533
17α - (2 - ALKYNYL) - 1 - METHYLESTRA - 1,3,5(10)-
TRIENE-3,17β-DIOLS AND ESTERS THEREOF
Paul D. Klimstra, Northbrook, Ill., assignor to
G. D. Searle & Co., Chicago, Ill.
No Drawing. Filed Jan. 31, 1969, Ser. No. 795,715
Int. Cl. C07c 169/20
U.S. Cl. 260—397.5
6 Claims

ABSTRACT OF THE DISCLOSURE

17α-(2-alkynyl)-1-methylestra - 1,3,5(10) - triene-3, 17β-diols and esters thereof exhibit valuable pharmacological activity, e.g. estrogen-inhibitory, and are prepared by the reaction of 1-methylestra-1,3,5(10)-trien-17-one derivative carrying at the 3-position a substituted oxy group, e.g. tetrahydropyran-2-yloxy, with the Grignard reagent prepared from a 1-halo-2-alkyne followed by cleavage of the 3-(substituted oxy) function and acylation of the resulting diols.

---

The present invention is concerned with novel chemical compounds of the steroid family and are characterized by a 1-methyl substituent and an estra-1,3,5(10)-triene ring system. More particularly, these compounds are 17α-(2-alkynyl) - 1 - methylestra-1,3,5(10)-triene-3,17β-diols and esters thereof and are represented by the following structural formula

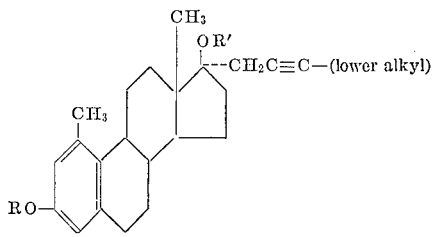

wherein R and R' are selected from the group consisting of hydrogen and a lower alkanoyl radical.

Typical of the lower alkyl radicals denoted in the foregoing structural formula are methyl, ethyl, propyl, butyl, pentyl, hexyl, heptyl and the branched-chain isomers thereof.

The lower alkanoyl radicals encompassed by that formula are exemplified by formyl, acetyl, propionyl, butyryl, valeryl, caproyl, heptanoyl and the corresponding branched-chain isomers.

The novel compounds of the present invention are conveniently manufactured by utilizing 3-hydroxy-1-methylestra-1,3,5(10)-trien-17-one as the starting material. The 3-hydroxy function is first protected by a readily removable blocking group, e.g. tetrahydropyran-2-yl; the resulting derivative is then contacted with the Grignard reagent obtained from a 1-halo-2-alkyne. Those processes are specifically illustrated by the reaction of 3-hydroxy-1-methylestra-1,3,5(10)-trien-17-one with dihydropyran in the presence of p-toluenesulfonic acid to afford 1-methyl-3-tetrahydropyran-2'-yloxyestra - 1,3,5(10) - trien-17-one and reaction of the latter derivative with 2-butynyl magnesium bromide, thus affording 17α-(2-butynyl)-1-methylestra- - 1,3,5(10) - triene-3,17β-diol 3-tetrahydropyran-2'-yl ether. Removal of the protecting group is readily effected by an acidic reagent. The aforementioned 17α-(2-butynyl) - 1 - methylestra-1,3,5(10)-triene-3,17β-diol 3-tetrahydropyran-2'-yl ether is thus allowed to react at room temperature with p-toluenesulfonic acid to produce 17α-(2-butynyl) - 1 - methylestra-1,3,5(10)-triene-3,17β-diol.

The reaction of the instant diols with a lower alkanoic acid anhydride or halide, preferably in the presence of a suitable acid acceptor such as pyridine or triethylamine, results in the corresponding esters. The use of mild reaction conditions affords the 3-monoesters while the 3,17-diesters are obtained by the use of more strenuous conditions. The room temperature reaction of 17α-(2-butynyl) - 1 - methylestra-1,3,5(10)-triene-3,17β-diol with acetic anhydride in pyridine thus yields 17α-(2-butynyl)-1-methylestra - 1,3,5(10) - triene-3,17β-diol 3-acetate, while conduct of that reaction at steam bath temperature affords 17α-(2-butynyl) - 1 - methylestra-1,3,5(10)-triene-3,17β-diol 3,17-diacetate.

The compounds of this invention exhibit valuable pharmacological properties. They are, for example, antihormonal agents as is evidenced by their estrogen-inhibitory activity.

The estrogen-inhibitory property of the instant compounds is specifically illustrated by the activity of 17α-(2-butynyl) - 1 - methylestra-1,3,5(10)-triene-3,17β-diol 3-acetate when tested in the following assay:

The assay as disclosed by Edgren and Calhoun, Proc. Soc. Exper. Biol. Med., 94, 537 (1957) is described as follows:

Groups of 8–10 immature female mice are injected once daily for a period of 3 days with 0.1 ml. of a corn oil solution containing 0.1 mcg. of estrone together with ⅓ of the selected dose of the test compound. A total dose of 1 mg. is usually employed. 24 hours after the final injection the animals are sacrificed and their uteri are removed, cleaned and weighed. The uterine weights are compared to those of a similar group of control animals receiving injections of corn oil containing the same dose of estrone alone. A compound is designated active if it produces a uterine response significantly smaller $$(P \leq 0.01)$$

than control values. Potency is expressed in terms of percentage of activity of the standard, i.e. progesterone.

The invention will appear more fully from the examples which follow. These examples are set forth by way of illustration only and it will be understood that the invention is not to be construed as limited thereby either in spirit or in scope as many modifications both in materials and methods will be apparent from this disclosure to those skilled in the art. In these examples, temperatures are given in degrees centigrade (° C.) and quantities of materials in parts by weight unless otherwise noted.

EXAMPLE 1

To a mixture consisting of 10 parts of 3-hydroxy-1-methylestra-1,3,5(10)-trien-17-one, 6.4 parts of dihydropyran and 176 parts of benzene is added 0.02 part of p-toluenesulfonic acid monohydrate and that heterogeneous mixture is stirred at room temperature for about 16 hours. At the end of that reaction period approximately 0.2 part of pyridine is added and the solvent is removed by distillation under reduced pressure. The resulting oily residue solidifies upon standing and is purified by recrystallization from aqueous acetone to yield 1-methyl-3-tetrahydropyran - 2'-yloxyestra-1,3,5(10)-trien-17-one, characterized by an optical rotation of +180.5°.

EXAMPLE 2

To a mixture of 2.3 parts of magnesium turnings, 0.12 part of powdered mercuric chloride and 35 parts of ether is added, at 0–5° with stirring over a period of about 90 minutes, a solution of 10.4 parts of 1-bromo-2-butyne in 43 parts of ether. A crystal of iodine is added at the beginning of the latter addition in order to initiate the reaction. The mixture is kept cool and stirred for an additional 1 hour following completion of the addition. At the end of that time a solution of 7 parts of 1-methyl-3-tetrahydropyran-2'-yloxyestra-1,3,5(10)-trien-17-one in 59 parts of ether is added dropwise with cooling over a period of about 1 hour. Stirring at 0–5° is continued for about 1 hour, following which time the mixture is heated at the reflux temperature for about 16 hours. Excess saturated aqueous ammonium chloride is added and the ether layer is separated, washed with water, dried over anhydrous calcium sulfate containing decolorizing carbon and stripped of solvent by distillation under reduced pressure, thus affording, as an oil, 17α-(2-butynyl)-1-methylestra-1,3,5(10)-triene-3,17β-diol 3-tetrahydropyran-2'-yl ether.

EXAMPLE 3

To a solution of 8 parts of 17α-(2-butynyl)-1-methylestra-1,3,5(10)-triene-3,17β-diol 3-tetrahydropyran-2'-yl ether in 160 parts of methanol is added 0.2 part of p-toluenesulfonic acid and the resulting mixture is stirred at room temperature for about 1 hour. At the end of that time water and 1 part of pyridine are added and the resulting neutralized mixture is extracted with ethyl acetate. The organic layer is separated, washed with water, dried over anhydrous sodium sulfate containing decolorizing carbon and distilled to dryness under reduced pressure. The oily crude product thus obtained is chromatographed on a silica gel column and eluted with 5% ethyl acetate in benzene. That eluted material is purified by recrystallization from aqueous methanol, thus affording 17α-(2-butynyl)-1-methylestra-1,3,5(10)-triene-3,17β-diol, melting at about 190–194°. This compound exhibits an optical rotation of +124° and is further characterized by the following structural formula

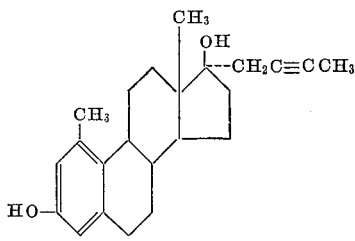

EXAMPLE 4

A mixture consisting of 2.2 parts of 17α-(2-butynyl)-1-methylestra-1,3,5(10)-triene-3,17β-diol, 15 parts of acetic anhydride and 25 parts of pyridine is kept at room temperature for about 2½ hours, then is carefully poured into a mixture of ice and water. The resulting sticky solid is collected by filtration, washed on the filter with water, then extracted with ether. The ether solution is dried over anhydrous sodium sulfate containing decolorizing carbon and stripped of solvent by distillation under reduced pressure to afford the oily crude product. The latter material is chromatographed on a silica gel column and eluted with 1% ethyl acetate in benzene. The eluted fraction is further purified by recrystallization from aqueous methanol to yield 17α-(2-butynyl)-1-methylestra-1,3,5(10)-triene-3,17β-diol 3-acetate, melting at about 96–99°. This compound is represented by the following structural formula

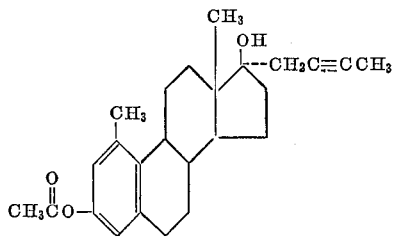

EXAMPLE 5

When an equivalent quantity of 1-bromo-2-pentyne is substituted in the procedure of Example 2, there is produced 1-methyl-17α-(2-pentynyl)estra-1,3,5(10)-triene-3,17β-diol 3-tetrahydropyran-2'-yl ether.

EXAMPLE 6

The substitution of an equivalent quantity of 1-methyl-17α-(2-pentynyl)estra-1,3,5(10)-triene-3,17β-diol 3-tetrahydropyran-2'-yl ether in the procedure of Example 3 results in 1-methyl-17α-(2-pentynyl)estra-1,3,5(10)-triene-3,17β-diol.

EXAMPLE 7

When an equivalent quantity of 1-methyl-17α-(2-pentynyl)estra-1,3,5(10)-triene-3,17β-diol is substituted in the procedure of Example 4, there is produced 1-methyl-17α-(2-pentynyl)estra-1,3,5(10)-triene-3,17β-diol 3-acetate.

EXAMPLE 8

A mixture consisting of 1 part of 17α-(2-butynyl)-1-methylestra-1,3,5(10)-triene-3,17β-diol, 10 parts of acetic anhydride and 20 parts of pyridine is heated on the steam bath for about 4 hours, then is carefully poured into a mixture of ice and water. The resulting aqueous mixture is extracted with ether and the ether layer is separated, washed with water, dried over anhydrous sodium sulfate and concentrated to dryness under reduced pressure to yield 17α-(2-butynyl)-1-methylestra-1,3,5(10)-triene-3,17β-diol 3,17-diacetate.

EXAMPLE 9

By substituting an equivalent quantity of propionic anhydride and otherwise proceeding according to the processes described in Example 8, there is produced 17α-(2-butynyl)-1-methylestra-1,3,5(10)-triene-3,17β-diol 3,17-dipropionate.

EXAMPLE 10

The substitution of an equivalent quantity of propionic anhydride in the procedure of Example 4 results in 17α-(2-butynyl)-1-methylestra-1,3,5(10)-triene-3,17β-diol 3-propionate.

What is claimed is:
1. A compound of the formula

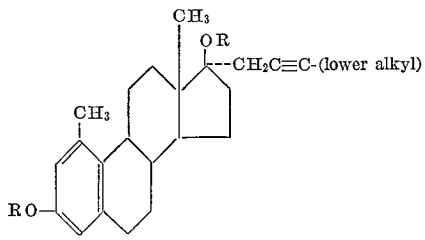

wherein R is selected from the group consisting of hydrogen and a lower alkanoyl radical, R' is hydrogen or a lower alkanoyl radical when R is a lower alkanoyl radical and R' is hydrogen when R is hydrogen.

2. As in claim 1, a compound of the formula

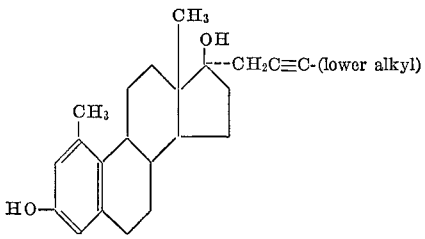

3. As in claim 1, a compound of the formula

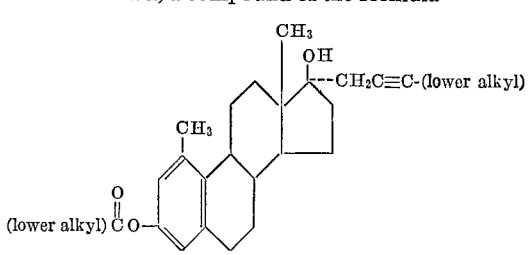

4. As in claim 1, a compound of the formula
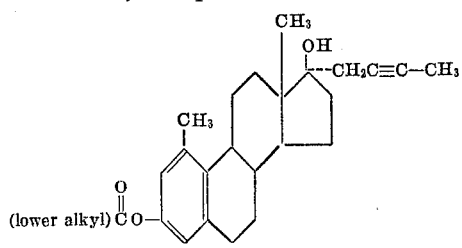
5. As in claim 1, the compound which is 17α - (2-butynyl)-1-methylestra-1,3,5(10)-triene-3,17β-diol.
6. As in claim 1, the compound which is 17α - (2-butynyl)-1-methylestra - 1,3,5(10) - triene-3,17β-diol 3-acetate.
References Cited
UNITED STATES PATENTS
3,210,390   10/1965   Meloy.
OTHER REFERENCES
Elton et al. "Experientia" (1966) vol. 7, pp. 437–439 relied on.
ELBERT L. ROBERTS, Primary Examiner
U.S. Cl. X.R.
260—239.55

FJ-1050
(5/69)

UNITED STATES PATENT OFFICE
CERTIFICATE OF CORRECTION

Patent No. 3,560,533    Dated February 2, 1971

Inventor(s)    Paul D. Klimstra

It is certified that error appears in the above-identified patent and that said Letters Patent are hereby corrected as shown below:

Column 4, the first formula 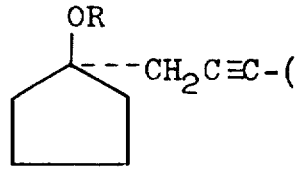

should be 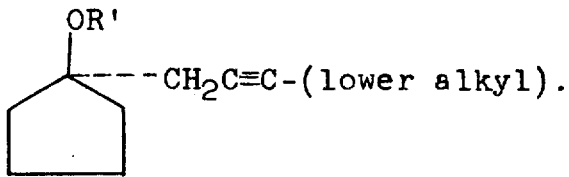

Signed and sealed this 22nd day of June 1971.

(SEAL)
Attest:

EDWARD M. FLETCHER, JR.
Attesting Officer

WILLIAM E. SCHUYLER, JR.
Commissioner of Patents